Patented June 8, 1954

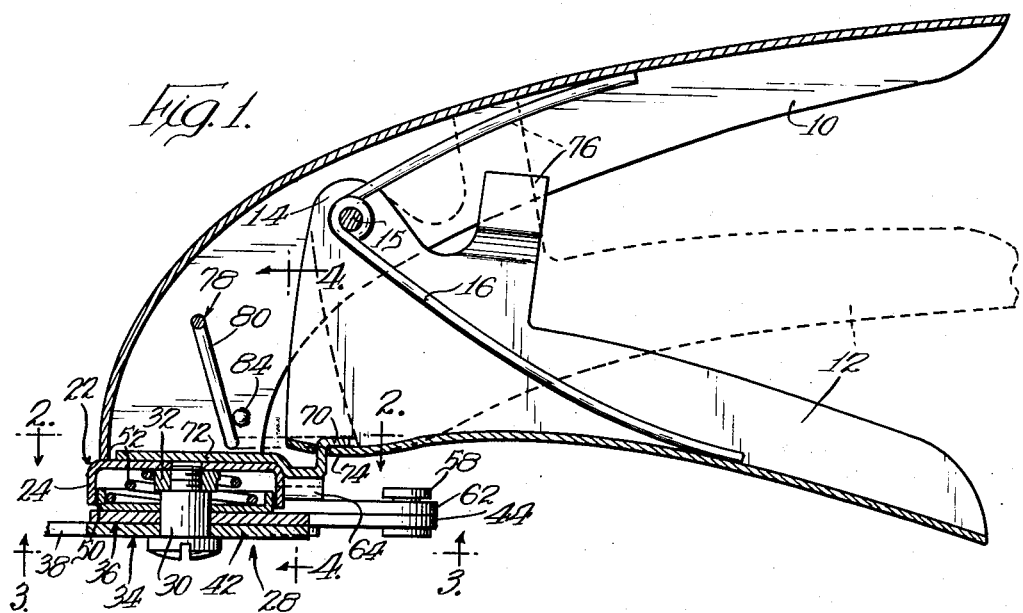
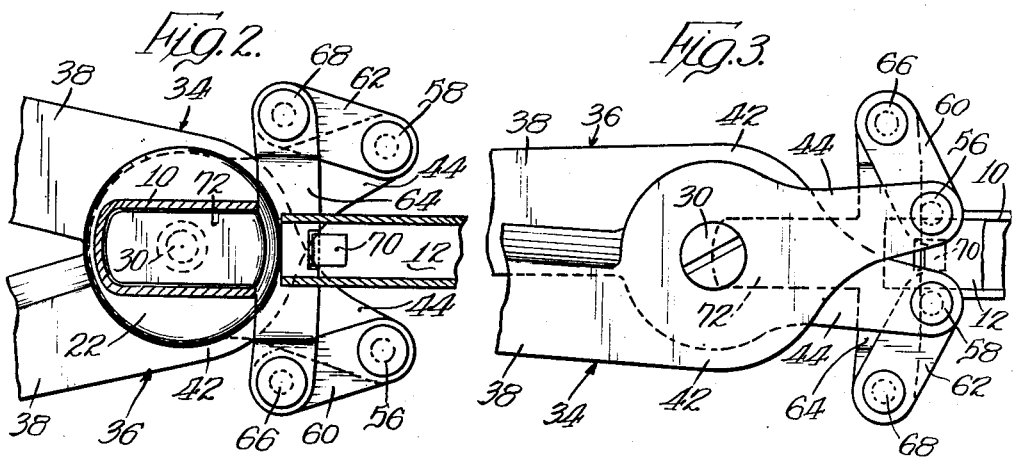
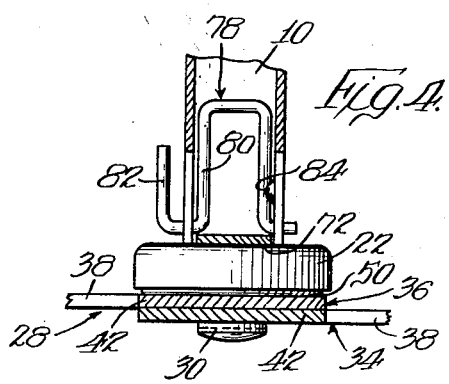

2,680,293

UNITED STATES PATENT OFFICE 2,680,293

GRASS SHEARS WITH VERTICAL HANDLE ACTION

Frederick Keller, Sturgis, Mich., assignor to Midwest Tool & Cutlery Company, Sturgis, Mich., a corporation of Michigan Application July 28, 1953, Serial No. 370,807

5 Claims. (Cl. 30—248)

The present invention relates to improvements in gardeners' grass shears or trimmers and, particularly, to improvements in shears of the type in which the blades are moved in a predetermined plane and are actuated upon relative movement of a pair of handles in a plane substantially perpendicular to the plane in which the blades are moved.

Devices of the general character referred to are well known in the art, but conventional devices have failed to attain optimum effectiveness and to meet the demands of the art. A grass shears of the character defined overcoming the failings of conventional grass shears is disclosed in the copending application of Lucien I. Yeomans, Serial No. 288,174, filed May 16, 1952, which has matured into Patent No. 2,662,285, granted December 15, 1953, and which is assigned to the assignee of the present application. It is an object of the present invention to provide improvements upon the grass shears disclosed in the said copending application.

In particular, it is an object of the present invention to provide improved toggle linkage means, improved toggle actuating means, and improved latch means in a grass shears of the character disclosed in the said copending application.

The grass shears disclosed in the said copending application comprises, generally, a pair of blades pivotally connected in criss-cross relation adjacent one end thereof, a relatively fixed handle, improved pivot means pivotally connecting the blades and supporting the blades on the fixed handle, a relatively movable handle pivoted to the fixed handle, a toggle linkage associated with and extending between the blades to the handle side of the pivot, the toggle linkage and the movable handle being operatively associated with one another whereby actuation of the handles effects actuation of the blades, and improved limit and lock means associated with the handles for automatically defining the limits of blade movement and for locking the blades in their closed position. The toggle linkage in such structure comprises a pair of links each pivotally connected to the extending end portion of one of the blades, the two links being pivotally connected centrally between the blades, to the handle side of the blade pivot, by means of a pivot pin which extends upwardly and engages in a driving portion of the relatively movable handle. The relative movable handle and the pin are so constructed with respect to one another that straight line movement of the actuating pivot of the toggle linkage is insured.

According to the present invention, I provide an improved toggle linkage for grass shears of the general character defined comprising a pair of links each pivotally connected to the end portion of one of the blades of the shears to the handle side of the pivotal mounting of the blades. The two links extend generally laterally outwardly from the blades and the free ends thereof are interconnected by means of a transverse strap extending between and pivotally connected to the links. This strap includes a tongue portion extending generally transversely of the strap portion thereof and received in the relatively fixed handle of the shears to be guided by said handle for straight line movement in a given plane. In such structure, as in the structure of the said copending application, the arrangement is such that movement of the toggle linkage toward its center or "made" position, during which movement the toggle linkage performs its greatest work, effects closing of the blades in their cutting stroke. The advantages of such linkage reside in its practicality, economy, efficiency and strength.

A further object of the invention is the provision of improved latch or lock means for grass shears of the general character described. Specifically, it is an object of the present invention to provide a highly economical and practical latch comprising finger means pivotally mounted in the relatively fixed handle for movement from an out-of-the-way position within the fixed handle to a latching position wherein the finger the two handles to retain the handles and the blades in the closed positions thereof. Further in accordance with the present invention, the said finger means includes a portion extending to the exterior of the fixed handle and comprising a crank for moving the finger means from its out-of-the-way position to its latching position. In addition, the said relatively fixed handle is preferably provided with detent means cooperable with the said finger means to retain the finger means in its out-of-the-way position.

A still further object of the present invention is to dispose the said finger means of the improved latch adjacent but in spaced relation to the housing of the pivotal mounting for the blades of the shears, whereby a space is defined between the pivot means and the finger means adapted for the reception and guidance of the transverse tongue of the connecting bar or strap of the toggle linkage, whereby the said tongue portion is guided for movement in a given plane by a portion of the pivot means and a portion of the finger means of the latch.

A further object of the invention is the provision of an improved grass shears of the general character defined that is economical of manufacture and assembly, convenient to use, and highly practical and efficient in operation.

Other objects and advantages of the invention will become apparent in the following detailed description of a preferred embodiment of the invention.

Now, in order to acquaint those skilled in the art with one manner of constructing and operating the improved grass shears of my invention, I shall describe, in connection with the accompanying drawings, a preferred embodiment of my invention and one mode of constructing the same.

In the drawings:

Figure 1 is a partial vertical sectional view of the improved shears of the present invention, the view showing the handles and latch in open position in solid lines and the closed and latched position of the handles in dotted lines;

Figure 2 is a fragmentary horizontal section taken substantially on line 2—2 of Figure 1;

Figure 3 is a fragmentary bottom view taken substantially on the line 3—3 of Figure 1; and Figure 4 is a fragmentary transverse vertical section taken substantially on the line 4—4 of Figure 1.

Referring now the drawings, I have shown a preferred embodiment of my invention as including an upper handle member 10 of generally channel shape in cross section, with the channel thereof opening downwardly, and a lower handle member 12, also of channel shape with the channel opening upwardly. If desired, the lower handle 12 may suitably be provided in the lower surface thereof with a plurality of indentations (not shown) to provide a finger grip by means of which the handles may be actuated with respect to one another, the upper handle being received in the palm of the user's hand. At the forward edge thereof, the lower handle member 12 is provided with a pair of upwardly extending legs 14 by means of which the lower handle 12 is pivotally connected to the upper handle 10, suitably by means of a pin 15. As shown, the handle 12 is pivotally connected to the handle 10 adjacent to but spaced from the forward end of the handle 10 so that the handle 12 is adapted for movement within the handle 10. The two handle members are normally biased apart by means of a spring 16, which comprises a conventional torsion spring including a coil portion mounted on the pivot pin 15 and a pair of tangentially extending end portions each of which engages one of the handles normally to bias the same apart.

At the forward end thereof, the upper handle member 10 is provided with a component part 22 comprising an inverted generally cup-shaped member presenting a cylindrical wall portion 24. The component part 22 is secured to the lower forward portions of the handle 10, preferably by means of welding. The component part 22 of the handle 10 comprises a housing for the main pivot 28 of the shears and constitutes one point of support for a pivot pin 30 of the main pivot 28. The pivot pin 30 preferably comprises a bolt having a fixed support in the relatively stationary upper handle 10 and having a head adapted to be disposed externally of the handles and the component part 22 in spaced relation to the fixed support thereof in the handle. To provide a fixed support for the bolt 30 within the handle 10, and yet to accommodate ready removal of the pivot pin or bolt, a nut 32 is secured to the component part 22 centrally of the end wall thereof. The nut 32 is preferably secured to the end wall of the housing or part 22 by means of projection welding and the component part 22 is preferably provided with an aperture communicating with the tapped bore of the nut to accommodate passage of the threaded portion of the bolt or pivot pin 30 if necessary. As shown, the bolt 30 is preferably provided with an enlarged central portion and a reduced threaded extension adapted to be threaded into the nut 32, the shoulder defined between the two portions of the shank of the bolt serving to limit entry of the bolt into the nut.

The head of the pivot pin or bolt 30 pivotally supports a pair of shear blades or blade members 34 and 36, the two blades being substantially identical, but being mounted oppositely of one another on the pivot pin 30. As will be appreciated, each blade comprises a forward blade portion 38 having a cutting edge, a central pivot portion 42 of generally circular outline, and a rearwardly extending tab or lever portion 44. While the blades have been shown only fragmentarily in the drawings, the same are of a generally conventional design well known in the art. The blades 34 and 36, as thus formed, are disposed in criss-cross relation and are pivotally connected, by the pivot pin 30, adjacent one end thereof. At the central or intersecting portions 42 thereof, each blade is apertured for the passage therethrough of the pivot pin or bolt 30. As is conventional, the cutting portions 38 of the two blades are oppositely curved, toward one another, in a direction transverse of the plane of the blades so that the cutting action of the blades occurs substantially at a single point on the cutting edge of each blade at a time. In other words, as the blades are moved toward one another, the cutting action of the blades will occur only at a single point, which point advances progressively from the inner toward the outer end of the blades as the blades are moved toward one another to the closed position thereof. This provides a highly efficient cutting action and renders the blades self-sharpening.

In some prior art structures, the hereinbefore described cutting action has been accommodated by the flexibility of the blades themselves, in other structures by providing a loose pivot pin, and in still others by providing means for flexibly or resiliently urging the blades toward one another. However, in the copending application of Lucien I. Yeomans, an improved main pivot has been provided, the general principles of which pivot are incorporated in the present embodiment of the grass shears of my invention. Specifically, the improved main pivot includes the component part or housing 22, and a spring pressed member 50 disposed within the housing 22 and adapted to engage the upper blade 36 to confine the blades between the member 50 and the head of the pivot pin or bolt 30. The member 50 is provided with a central aperture through which the pivot pin 30 extends so that the member 50 may move axially of the pin 30. A coil spring 52 is confined between the top wall of the housing 22, the fixed support of the pivot pin, and the member 50 to bias the member toward the head of the bolt 30 resiliently to confine the blades between the head of the bolt and the spring pressed member. Accordingly, it will be appreciated that as the blades move toward one another, and thus tend to separate at portions thereof rearwardly of the engaged points of the cutting edges, the spring 52 will yield to accommodate spreading of the blade members and yet will retain the cutting edges of the blades in operative association. Preferably, the spring 52 is spirally coiled and the member 50 is a generally cup-shaped stamping, whereby the lower large portion of the spring 52 is adapted to be pressed into the cup 50 and the smaller upper end of the spring is adapted to engage about the nut 32, thus to provide a partial assembly between the nut 32, spring 52 and member 50.

As will be apparent, the member 50 is received within and guided by the cylindrical wall portion 24 of the housing 22. The pin 30 passes through the central aperture provided in the member 50, the fit therebetween being preferably of a quite intimate nature so that the member 50 provides a second point of support for the pin 30, which second point is spaced from the first and relatively fixed support of the pin at the nut 32. The member 50, like substantially all of the component parts of the shears of the present invention is preferably stamped from sheet metal and is received within the housing 22 to be closely guided by means of the cylindrical portion 24 of the housing, whereby a firm secondary support for the pivot pin is afforded.

Adjacent the free end of the rearwardly extending tab or lever portion 44 thereof, each of the blades 34 and 36 is provided with an aperture adapted for the reception of a pivot pin, 56 and 58, respectively, by means of which a toggle link, 60 and 62, respectively, is pivotally connected thereto. The links 60 and 62, as shown in Figures 2 and 3, outwardly of the lever portions 44 of the blades and at their outer ends are interconnected by means of an actuating bar 64 which extends generally transversely of the blades and is pivotally connected at the opposite ends thereof to the respective links 60 and 62, as by means of pivot pins 66 and 68, respectively. As will be appreciated, the lever portions 44 of the two blades are identical and have the same disposition with respect to the pin 30. Also, the toggle links 60 and 62 are identical so that the central portion of the actuating bar 64 is disposed in alignment with the pivot pin 30 and the handles 10 and 12, the actuating bar being adapted for straight line movement in the direction of a line passing through the center of the bar 64, the pivot 30 and the engaged portions or points of the cutting edges of the blades. As will be apparent, the engaged portions or points of the cutting edges of the blades will each lie equi-distant from the pivot pin 30 and will also each lie equi-distant from the center of the actuating bar 64 of the toggle linkage.

As will be appreciated from Figures 1 and 2, the central portion of the actuating bar 64 is elevated with respect to the end portions thereof so that the actuating bar will not interfere with the pivot pins 56 and 58 between the links 60 and 62 and the blades 34 and 36 when the blades are moved to closed position, and so that the central portion of the actuating bar is disposed adjacent the top of the component part or housing 22 of the handle 10 for a purpose to be described hereinafter.

At the rearward edge of the central portion thereof, the actuating bar 64 is provided with an upwardly extending angular projection 70 for a purpose to be described. At the forward edge of the central portion thereof, the actuating bar 64 is provided with a forwardly projecting extension or tongue 72, which extends transversely of the bar 64 and longitudinally of the shears. The extension or tongue 72 comprises a generally strap-like member disposed substantially parallel to the central portion of the bar 64 and formed of a width and length equal approximately to the interior width and length of the forward portion of the channel shaped upper handle 10. The component part 22 of the handle 10, and the remainder of the main pivot 28, as pointed out hereinbefore, are formed in accordance with the said copending application of Lucien I. Yeomans, with the exception that the housing and pivot members are of reduced height with respect to the disclosure of the said copending application. Thus, the component part 22 is adapted to accommodate entry of the tongue or extension 72 of the actuating bar 64 within the lower forward portion of the handle 10, wherein the tongue 72 is guided for reciprocal straight line movement longitudinally of the handles, and thus of the shears as a whole. Accordingly, straight line actuation of the toggle linkage is assured.

At the forward portion thereof, the lower handle member 12 is provided in the lower base wall thereof with a slightly depending portion 74 provided with a central aperture adapted for the reception of the angular projection 70 of the actuating bar 64. The depending portion 74 of the lower handle 12 comprises a driving portion by means of which the actuating bar 64 is engaged and moved upon actuation of the lower handle 12 with respect to the upper handle 10. The driving or depending portion 74 of the lower handle member 12 is provided therein with a relatively narrow slot adapted merely for the passage of one leg of the angular projection 70, whereby the lower handle member 12 also assists in assuring straight line actuation of the bar 64 and the toggle linkage.

In assembly, the tongue portion 72 of the bar 64 is slidably received within the lower forward portion of the channel shaped upper handle 10 prior to assembly of the handles 10 and 12. Then, the lower handle 12 is first associated with the angular projection 70 of the bar 64, by disposing the lower handle 12 in a generally vertical position, moving the handle 12 so that the horizontal leg of the projection 70 is passed through the slot in the handle 12 and by then swinging the handle 12 with respect to the projection 70 to dispose the same in the relative positions shown in Figure 1, after which, the handle pivot pin 15 may be passed through the handles 10 and 12 and the coil of the spring 16 operatively to associate the two handles and the actuating bar. According to such structure, the actuating bar 64 can never be inadvertently disassociated from the handles 10 and 12, except on removal of the handle pivot pin 15.

In use and operation of the shears as thus far described, the upper handle member 10, the component part or housing 22, and the pivot pin 30 are secured together and comprise relatively stationary portions of the shears. The spring pressed member 50 is retained by the stationary portions of the shears and the remainder of the apparatus is suitably associated with the handle 12, which is the relatively movable handle, for actuation thereby. As the shears is used, the hand of the user primarily supports and guides the shears by means of the upper handle 10, which as is apparent comprises a frame or housing for the support and reception of the other components of the shears. Upon movement of the lower handle 12 toward the upper handle 10, the lower handle swings in an arc about its pivotal mounting 15, so as to move the driving or actuating portion 74 thereof rearwardly with respect to the handle 10. As the driving portion 74 of the handle 12 is moved rearwardly, the vertical leg of the projection 70 of the actuating bar 64 is engaged and moved rearwardly, such movement being in a straight line due to the guidance of the bar 64 by both of the handles.

As will be appreciated from a consideration of Figure 2, the toggle links 60 and 62 are in collapsed position, angularly related, when the handle member 12 is in its down position, at which time the blades and handle are open. Accordingly, as the actuating bar 64 is moved rearwardly by the actuation of the handle member 12, the toggle links 60 and 62 move toward their center of movement, that is, toward a straight line position, thus moving the lever portions 44 of the blades inwardly to move the cutting edge portions of the blades toward one another. When the toggle links 60 and 62 approach a position approximately in a straight line, as is shown in Figure 3, the blades are moved to their closed position, and are preferably moved to an overlapping position. In view of the foregoing, it will be appreciated that as the blades are closed and the cutting point therebetween moves outwardly along the length of the blades away from the main pivot 28, the force multiplication factor of the toggle linkage is increased to provide extreme ease of operation. During closing movement of the blades, the spring pressed follower member 50 maintains the blades in self-sharpening engagement and accommodates whatever movement is necessary between the blades due to the curvature thereof. The toggle linkage is readily adapted to accommodate the slight movement required between the blades during closing movement thereof.

When the blades are moved to their closed position, it is merely necessary for the user to relax his grip on the handle 12, whereupon the spring 16 moves the handle 12 downwardly or away from the handle 10, thus causing the projection 70 and the bar 64 to be moved forwardly to move the toggle linkage to its collapsed position, wherein the links 60 and 62 are disposed in angular relation and wherein the blades are opened. As will be appreciated, the narrow slot in the lower handle 12 intimately engages the angular projection 70 of the bar 64 to eliminate lost motion between the actuating handle 12 and the blades 34 and 36, whereby the blades and handles are maintained in positive driving connection.

During such actuation of the blades and the handles, the pivot pin 30 is firmly supported at spaced points by the spring pressed member 50 and the nut 32, and the spring pressed member is so disposed with respect to the blades and the pivot that bending stress is not imparted to the pivot pin 30 by the blades 34 and 36. Accordingly, operation of the shears is effected in a very ready and highly convenient manner. At the same time, the toggle linkage is actuated in the most efficient manner possible to reduce the exertion required on the part of the user in cutting grass.

In grass shears of the general character referred to herein, it is necessary that suitable means be provided to limit movement of the blades and handles in both directions, and it is also very desirable to provide means for locking the blades in their closed positions to reduce danger in handling of the shears and to prevent dulling of the blades when the shears are stored away. In accordance with these requirements, the present invention provides means for limiting blade and handle movement in the form, first, of an upstanding leg portion on at least one side wall of the channel shaped lower handle member 12, as indicated at 76, adapted to engage the base wall of the channel shaped upper handle member 10 to limit closing movement of the handles and thus of the blades. Preferably, the leg or stop member 76 is formed by bending portions of each of the side walls of the lower handle into abutting engagement centrally of the upper handle whereby the lower handle is reinforced and a firm and positive limit or stop is provided. As means for limiting opening movement of the blades and handles, the actuating bar 64 and the extension or tongue 72 thereof are admirably adapted for cooperation with the handle 10 to define a limit of opening movement. In particular, the forward edge of the tongue 72 may suitably abut against the base wall of the handle 10, or the laterally extending portions of the bar 64 may suitably abut against the free edge of the side walls of the handle 10, thus to limit opening movement. Such movement limiting means, as will be appreciated, are readily and economically provided.

As pointed out hereinbefore, the present invention provides improved latch means for shears of the general character described. Such means is, according to the invention, of a highly economical and practical nature and may suitably comprise, as is shown in Figures 1 and 4, a generally S-shaped piece of spring steel or the like pivotally mounted within the handle member 10. In particular, as is best shown in Figure 4, the latch comprises a piece of spring steel 78 bent in a suitable manner, first, to provide a generally inverted U-shaped portion 80 adapted to be received within the channel shaped handle 10 and including horizontal portions journaled in the opposite walls of the channel of the handle, whereby the latch 78 is pivotal from an out-of-the-way position within the interior of the handle, as shown in solid lines in Figure 1, to a substantially horizontal position, as shown in dotted lines in Figure 1, wherein the U-shaped portion 80 thereof abuts the forward portion of handle 12 thus to prevent movement of the handles away from one another under the urge of the spring 16. To provide means for actuating the latching portion 80 of the member 78, said member preferably includes a handle portion or crank 82 disposed exteriorly of one wall of the channel shaped handle member 10 and extending in the same general plane as the U-shaped portion 80 thus to define a crank operable by the user of the shears to lock and unlock the shears. To prevent inadvertent or accidental disposition of the latch in its locking position, I prefer to include a detent over which the latch 78 must move in its travel to and from locking position. Specifically, a small dimple may be formed in one side wall of the handle 10 to form a projection 84 extending into the path of movement of one leg of the U-shaped portion 80 of the latch 78, whereby that portion of the latch must flex resiliently to pass over the projection 84. Accordingly, the projection 84, in conjunction with one leg of the latch 78, forms a detent preventing inadvertent or accidental movement of the latch from its out-of-the-way position to its locking position. As will be apparent, such latch, and the detent means therefor, is of an extremely economical, and yet highly practical construction.

In addition to the above, as will be apparent from Figure 1, the portions of the latch 78 that are journaled in the side walls of the upper handle 10 are disposed in slightly spaced relation to the upper surface of the housing 22 to define a passageway for the reception of the extension or tongue portion 72 of the actuating bar 64 so that the tongue 72 is confined between the latch 78 and the top of the component part or housing 22 of the handle 10, whereby movement of the actuating bar 64 is confined to straight line movement in a horizontal plane, thus insuring proper and optimum actuation of the toggle linkage.

As is briefly pointed out hereinbefore, substantially all of the component parts of the grass shears of the present invention may suitably comprise sheet metal stampings, while the remainder of the elements are formed in entirely conventional and economical manners. Accordingly, it will be appreciated that the shears of the present invention is extremely economical in manufacture. Also, the assembly of the various component parts of the shears is readily and economically accomplished. In the end design, as will be readily appreciated from Figure 1, the shears presents an extremely neat and efficient appearance, which has heretofore been very difficult to attain due to the disadvantages of prior conventional structures. Likewise, it will be appreciated that due to the particular construction and formation thereof, as described hereinbefore, the shears of the present invention is extremely sturdy and adapted for service over extended periods of time.

While I have described and shown what I regard to be a preferred embodiment of my invention, it will be apparent that various changes, rearrangements and modifications thereof may be made therein without departing from the scope of the invention, as defined by the appended claims.

I claim:

1. A shears comprising a relatively fixed handle, a pivot pin fixedly supported in said handle, a pair of blades pivotally mounted on said pivot pin, a spring pressed member mounted on said pivot pin and resiliently retaining said blades in engagement, a second handle pivotally connected to said fixed handle for movement in a plane transversely of the plane of movement of said blades, a link pivotally connected to each of said blades to the handle side of said pivot pin, said links extending generally laterally outward from said blades, and an actuator bar extending between and pivotally connected to the free ends of said links, said links in the open position of said blades being disposed in angular relation and being movable by said bar toward straight line relation to close said blades, said bar being connected to said second handle for actuation thereby.

2. A shears comprising a relatively fixed handle, a pivot pin fixedly supported in said handle, a pair of blades pivotally mounted on said pivot pin, a spring pressed member mounted on said pivot pin and resiliently retaining said blades in engagement, a second handle pivotally connected to said fixed handle for movement in a plane transversely of the plane of movement of said blades, a link pivotally connected to each of said blades to the handle side of said pivot pin, said links extending generally laterally outwardly from said blades, and a bar extending between and pivotally connected to the free ends of said links, said links in the open position of said blades being disposed in angular relation and being movable by said bar toward straight line relation to close said blades, said bar being connected to said second handle to establish driving connection between said second handle and said blades, said fixed handle including a portion of channel shape in cross section adjacent said pivot pin, said bar including a tongue portion projecting within and conformably and slidably received within the channel portion of said fixed handle, whereby said actuating bar is guided by movement of said tongue in said fixed handle to assure straight line actuation of said bar and said links.

3. A shears comprising a relatively fixed handle, a pivot pin fixedly supported in said handle, a pair of blades pivotally mounted on said pivot pin, a spring pressed member mounted on said pivot pin and resiliently retaining said blades in engagement, a second handle pivotally connected to said fixed handle for movement in a plane transversely of the plane of movement of said blades, a link pivotally connected to each of said blades to the handle side of said pivot pin, said links extending generally laterally outward from said blades, and a bar extending between and pivotally connected to the free ends of said links, said links in the open position of said blades being disposed in angular relation and being movable by said bar toward straight line relation to close said blades, said bar including a projection at the rearward edge thereof, said second handle having a slot therein within which said projection is received operatively to associate said second handle and said bar to establish driving connection between said second handle and said blades, said bar at the forward edge thereof including a forwardly extending tongue, said fixed handle including a portion of channel shape adjacent said pivot pin, said tongue being slidably and conformably received within said channel portion of said fixed handle, whereby said bar is guided for straight line movement by said fixed handle and said second handle, and a spring confined between said handles normally biasing said links to the said angular relation thereof.

4. A shears comprising a relatively fixed handle, a pivot pin fixedly supported in said handle, a pair of blades pivotally mounted on said pivot pin, a spring pressed member mounted on said pivot pin and resiliently retaining said blades in engagement, a second handle pivotally connected to said fixed handle for movement in a plane transversely of the plane of movement of said blades, a toggle linkage connecting said blades, said linkage including a pair of links each pivotally connected to one of said blades to the handle side of said pivot pin, said links in the open position of said blades being disposed in angular relation and being movable away from said pivot pin toward straight line relation to close said blades, means connecting said links and said second handle to establish driving connection between said second handle and said blades, the forward portion of said second handle being spaced from the forward portion of said fixed handle and said pivot pin, said fixed handle including a portion of channel shape adjacent said pivot pin, and a latch journaled in said channel portion of said fixed handle, said latch including a finger portion movable from an out-of-the-way position in the channel portion of said fixed handle toward the forward portion of said second handle when said second handle is moved toward said fixed handle and engageable with the forward portion of said second handle to retain said second handle in its position adjacent said fixed handle thus to retain said blades in their closed position.

5. A shears comprising a relatively fixed handle, a pivot pin fixedly supported in said handle, a pair of blades pivotally mounted on said pivot pin, a spring pressed member mounted on said pivot pin and resiliently retaining said blades in engagement, a second handle pivotally connected to said fixed handle for movement in a plane transversely of the plane of movement of said blades, a link pivotally connected to each of said blades to the handle side of said pivot pin, said links extending generally laterally outward from said blades, a bar extending between and pivotally connected to the free ends of said links, said links in the open position of said blades being disposed in angular relation and being movable away from said pivot pin by said bar toward straight line relation to close said blades, said bar being connected to said second handle to establish driving connection between said second handle and said blades, said fixed handle including a portion of channel shape adjacent said pivot pin, a housing around said pivot pin for said spring pressed member, said bar including a tongue extending forwardly therefrom slidably and conformably received within said channel portion of said fixed handle, and a latch journaled in said channel portion of said fixed handle in spaced relation to said housing, said latch being movable from an out-of-the-way position within said channel portion toward the forward edge of said second handle, said second handle being movable toward said first handle to close said blades, said latch being engageable with the forward edge of said second handle in the closed position of said blades to retain said second handle in fixed relation to said fixed handle whereby said blades are latched in the closed position thereof, said tongue being disposed between and guided for movement in a given plane by said housing and said latch.

No references cited.